(12) United States Patent
Fujiwara et al.

(10) Patent No.: US 11,806,809 B2
(45) Date of Patent: Nov. 7, 2023

(54) JOINING STRUCTURE AND JOINING METHOD

(71) Applicant: Panasonic Intellectual Property Management Co., Ltd., Osaka (JP)

(72) Inventors: Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 554 days.

(21) Appl. No.: 17/011,557

(22) Filed: Sep. 3, 2020

(65) Prior Publication Data

US 2020/0398378 A1 Dec. 24, 2020

Related U.S. Application Data

(63) Continuation of application No. PCT/JP2018/041378, filed on Nov. 7, 2018.

(30) Foreign Application Priority Data

Mar. 5, 2018 (JP) .................................. 2018-038911

(51) Int. Cl.
*B23K 103/18* (2006.01)
*B23K 26/244* (2014.01)
*B23K 26/323* (2014.01)

(52) U.S. Cl.
CPC .......... *B23K 26/244* (2015.10); *B23K 26/323* (2015.10)

(58) Field of Classification Search
CPC ................ B23K 26/244; B23K 26/323; B23K 2103/18; B23K 26/242
See application file for complete search history.

(56) References Cited

U.S. PATENT DOCUMENTS

| 5,448,831 A | 9/1995 | Harwood |
| 2008/0131758 A1 | 6/2008 | Makovetski et al. |

(Continued)

FOREIGN PATENT DOCUMENTS

| CN | 101536215 | 9/2009 |
| JP | 54-52264 | 4/1979 |

(Continued)

OTHER PUBLICATIONS

English translation of JP2018051570 (Year: 2018).*

(Continued)

*Primary Examiner* — Jun S Yoo
(74) *Attorney, Agent, or Firm* — Wenderoth, Lind & Ponack, L.L.P.

(57) ABSTRACT

A first member and a second member are formed of metal materials of the same type and a third member is formed of a material of a different type that is difficult to weld to the first member and the second member. The first member and the second member are welded to each other via a through hole with the third member interposed therebetween in a region corresponding to a first protrusion. For the first member and the third member, and the second member and the third member, each of respective outer peripheral portions of an overlapping portion of the first member and the third member and an overlapping portion of and the second member and the third member is welded.

5 Claims, 5 Drawing Sheets (56) References Cited

U.S. PATENT DOCUMENTS

| | | |
|---|---|---|
| 2009/0278371 A1 | 11/2009 | Fuchs et al. |
| 2011/0170946 A1 | 7/2011 | Schneegans et al. |
| 2016/0136880 A1 | 5/2016 | Matsuo et al. |
| 2019/0047087 A1 | 2/2019 | Kawamoto et al. |
| 2019/0076962 A1 | 3/2019 | Kawamoto et al. |
| 2020/0298340 A1 | 9/2020 | Fujiwara et al. |

FOREIGN PATENT DOCUMENTS

| | | | | |
|---|---|---|---|---|
| JP | 2006035285 A | * | 2/2006 | |
| JP | 2008-6465 | | 1/2008 | |
| JP | 2018051570 A | * | 4/2018 | ............ B21D 22/02 |
| WO | WO-2007108079 A1 | * | 9/2007 | ........... B23K 35/286 |
| WO | 2017/170106 | | 10/2017 | |
| WO | 2017/170517 | | 10/2017 | |
| WO | 2017/170518 | | 10/2017 | |

OTHER PUBLICATIONS

English translation of WO2007108079 (Year: 2007).*
English translation of JP2006035285 (Year: 2006).*
Office Action dated Jan. 29, 2022 in corresponding Chinese Patent Application No. 201880090763.6.
Extended European Search Report dated March 25, 2021 in counterpart European Patent Application No. 18908403.1.
International Search Report dated Jan. 29, 2019 in International (PCT) Application No. PCT/JP2018/041378.
Office Action dated Aug. 17, 2023 in corresponding European Patent Application 18 908 403.1, 6 pages.

* cited by examiner

JOINING STRUCTURE AND JOINING METHOD

CROSS-REFERENCE TO RELATED APPLICATION

This is a continuation of International Application No. PCT/JP2018/041378 filed on Nov. 7, 2018, which claims priority to Japanese Patent Application No. 2018-038911 filed on Mar. 5, 2018. The entire disclosures of these applications are incorporated by reference herein.

BACKGROUND

The present disclosure relates to a joining structure and a joining method.

Conventionally, joining structures in which a first material and a second material that are formed of metal materials of the same type which can be welded to each other are welded in a state in which a third material that is difficult to weld to the first material and the second material is interposed between the first material and the second material, and thus, the third material as a material of a different type is compressed and fixed have been known (see, for example, International Patent Publication No. WO2017/170517).

SUMMARY

Incidentally, in a joining structure in which a material of a different type is interposed between metal materials of the same type, there is a probability that moisture enters the joining structure from outside through a gap between the material of the different type and each of the metal materials of the same type in an overlapping direction. In some cases, the moisture that has entered in the joining structure causes an electrolytic corrosion to occur in a portion in which the material of the different type and the metal materials of the same type overlap, and thus, a joining strength is reduced.

In view of the foregoing, the present disclosure has been devised and it is therefore an object of the present disclosure to restrain the occurrence of an electrolytic corrosion in a portion in which metal materials of the same type and a material of a different type overlap.

Each aspect of the present disclosure is directed to a joining structure including a first member formed of a metal material, a second member formed of a metal material of a same type as that of the first member which can be welded to the first member, and a third member formed of a material that is difficult to weld to the first member and the second member, the first member, the second member, and the third member being jointed to each other, and the following solutions have been devised.

That is, a first aspect is characterized in that, in the joining structure, a protrusion is provided in at least one of the first member and the second member, a through portion in which the protrusion is inserted is formed in the third member, the first member and the second member are welded to each other via the through portion with the third member interposed therebetween in a region corresponding to the protrusion, and each of an outer peripheral portion of an overlapping portion of the first member and the third member and an outer peripheral portion of an overlapping portion of the second member and the third member is welded.

According to the first aspect, the first member and the second member are formed of metal materials of the same type and the third member is formed of a material of a different type which is difficult to weld to the first member and the second member. The first member and the second member are welded to each other via the through portion with the third member interposed therebetween in the region corresponding to the protrusion. For the first member and the third member, and the second member and the third member, each of the respective outer peripheral portions of the overlapping portion of the first member and the third member and the overlapping portion of and the second member and the third member is welded.

Thus, the occurrence of an electrolytic corrosion in a portion in which the first member and the second member that are metal materials of the same type and the third member that is a material of a different type overlap can be restrained.

Specifically, by welding each of the outer peripheral portion of the overlapping portion of the first member and the third member and the outer peripheral portion of the overlapping portion of the second member and the third member, a sealed joining structure in which a gap between the first member, the second member, and the third member in an overlapping direction is filled can be achieved.

With the above described configuration, invasion of moisture into the overlapping portions of the first member, the second member, and the third member from outside can be restrained. Thus, the occurrence of an electrolytic corrosion in the overlapping portions of the first member, the second member, and the third member can be restrained and the joining strength can be ensured.

A second aspect is characterized in that, in the joining structure of the first aspect, the regions of the first member and the second member corresponding to the protrusion, the outer peripheral portion of the overlapping portion of the first member and the third member, and the outer peripheral portion of the overlapping portion of the second member and the third member are laser-welded to each.

According to the second aspect, joining of the first member, the second member, and the third member may be performed by laser welding.

A third aspect is characterized in that, in the joining structure of the second aspect, the regions of the first member and the second member corresponding to the protrusion, the outer peripheral portion of the overlapping portion of the first member and the third member, and the outer peripheral portion of the overlapping portion of the second member and the third member are laser-welded to each by radiating laser light from either of one member side among the first member, the second member, and the third member, which is formed of a material having a high laser absorption rate.

According to the third aspect, the laser light may be radiated from either of one member side among the first member, the second member, and the third member which is formed of a material having a high laser absorption rate. For example, in a case in which the first member and the second material are formed of a soft steel material and the third member is formed of an aluminum material, welding may be performed by radiating the laser light from a side in which the first material and the second member are provided, because the soft steel material has a lower reflectance to the laser light than that of the aluminum material, that is, the soft steel material has a higher laser absorption rate than that of the aluminum material. Thus, energy of the laser light can be efficiently absorbed, and the first member, the second member, and the third member can be sufficiently melted.

A fourth aspect is characterized in that, in the joining structure of the first aspect, the regions of the first member and the second member corresponding to the protrusion are laser-welded, and the outer peripheral portion of the overlapping portion of the first member and the third member and the outer peripheral portion of the overlapping portion of the second member and the third member is welded using a filler material to each.

According to the fourth aspect, joining of the first member and the second member may be performed by laser welding, and joining of the outer peripheral portion of the first member and the third member and joining of the outer peripheral portion of the second member and the third member may be performed by welding using a filler material, such as, for example, arc welding or laser filler welding.

A fifth aspect is directed to a joining method, in which a first member formed of a metal material, a second member formed of a metal material of a same type as that of the first member which can be welded to the first member, and a third member formed of a material that is difficult to weld to the first member and the second member are joined to each other, at least one of the first member and the second member being configured such that a protrusion is provided therein, the third member being configured such that a through portion in which the protrusion is inserted is formed therein, and is characterized by including steps of inserting the protrusion in the through portion of the third member and interposing the third member between the first member and the second member, welding the first member and the second member to each other via the through portion by radiating laser light to a region corresponding to the protrusion, and welding each of an outer peripheral portion of an overlapping portion of the first member and the third member and an outer peripheral portion of an overlapping portion of the second member and the third member.

According to the fifth aspect, the first member and the second member are formed of metal materials of the same type and the third member is formed of a material of a different type which is difficult to weld to the first member and the second member. The first member and the second member are welded to each other via the through portion with the third member interposed therebetween in the region corresponding to the protrusion. For the first member and the third member, and the second member and the third member, each of the respective outer peripheral portions of the overlapping portion of the first member and the third member and the overlapping portion of and the second member and the third member is welded.

Thus, the occurrence of an electrolyte corrosion in the portions in which the first member and the second member that are metal materials of the same type and the third member that is a material of a different type overlap can be restrained.

According to the aspects of the present disclosure, it is possible to restrain the occurrence of an electrolytic corrosion in a portion in which metal materials of the same type and a material of a different type overlap.

DETAILED DESCRIPTION

Embodiments of the present disclosure will be described below with reference to the accompanying drawings. Note that the following description of preferred embodiments describes mere examples by nature and is not intended to limit the scope, application, or use of the present disclosure.

First Embodiment

Figure 1:
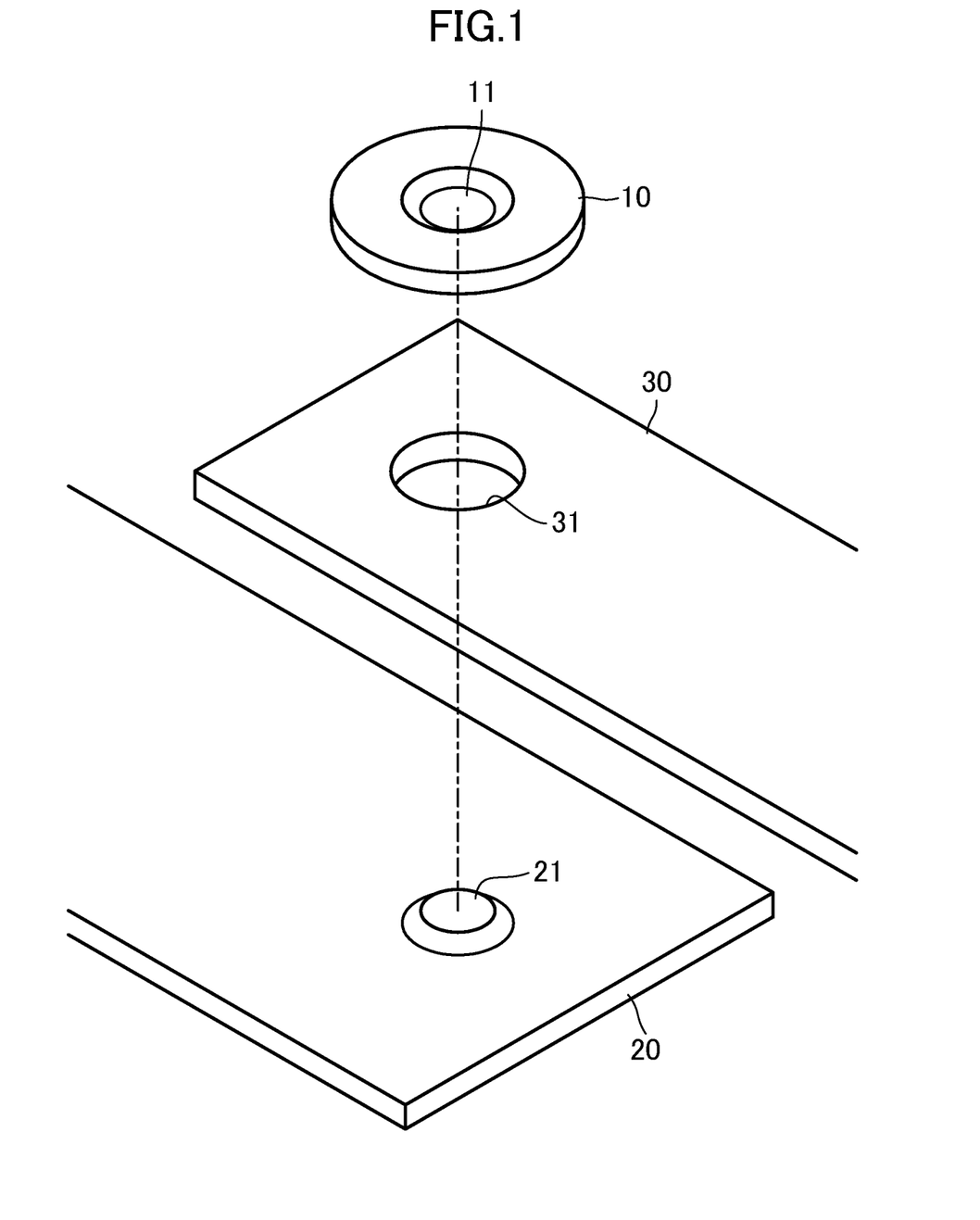
FIG. 1 is a perspective view illustrating a configuration of first to third members according to a first embodiment.
Figure 2:
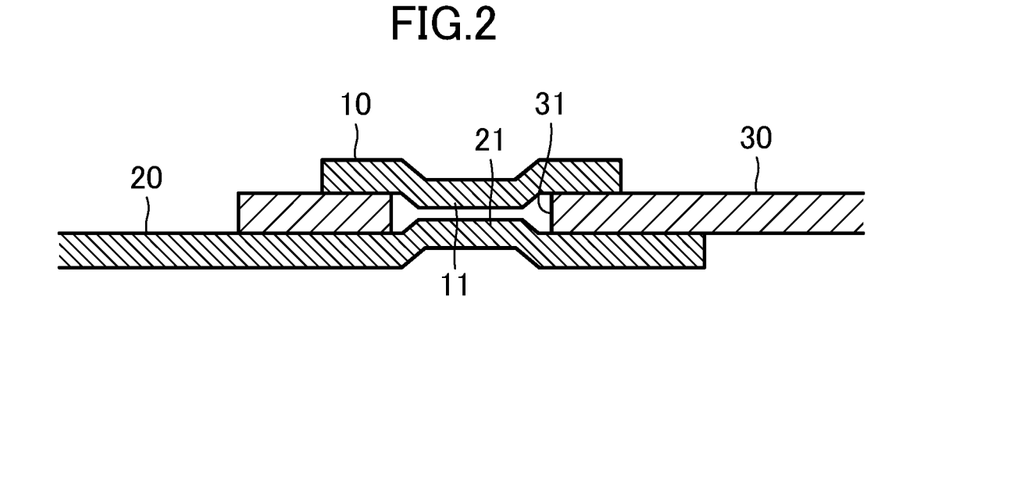
FIG. 2 is a cross-sectional view illustrating a joining structure before welding.
Figure 3:
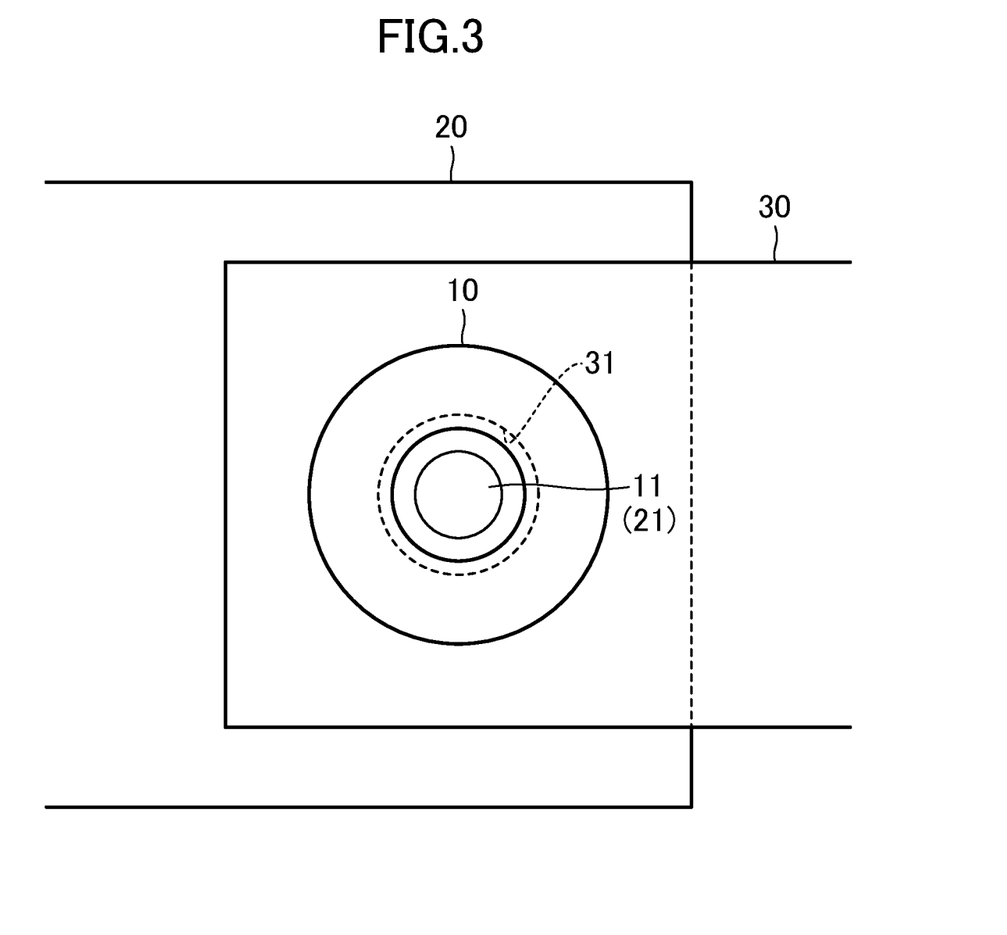
FIG. 3 is a plan view illustrating the joining structure before welding.

As illustrated in FIG. 1 to FIG. 3, in a joining structure according to this embodiment, in performing joining, a first member 10, a second member 20, and a third member 30 are disposed in a state in which the third member 30 is interposed between the first member 10 and the second member 20.

The first member 10 is a disk-like member formed of a metal material, and a first protrusion 11 having an embossed shape is formed so as to be tapered and protrude toward the second member 20 in a central portion of the first member 10.

The second member 20 is a plate-like member formed of a metal material of the same type as that of the first member 10 which can be welded to the first member 10, and a second protrusion 21 having an embossed shape is formed so as to be tapered and protrude toward the first member 10 therein.

The third member 30 is a plate-like member formed of a material that is difficult to weld to the first member 10 and the second member 20, and a through hole 31 as a through portion is formed therein. Note that, although the through hole 31 is provided as the through portion, the through portion may be a through groove. In performing joining, the third member 30 that is a material of a different type is disposed so as to be interposed between the first member 10 and the second member 20 that are metal materials of the same type.

In this case, the first protrusion 11 and the second protrusion 21 are disposed so as to be inserted in the through hole 31 of the third member 30 and to face to each other. Thus, the first protrusion 11 and the second protrusion 21 are inserted in the through hole 31 of the third member 30, and therefore, the through hole 31 has an effect of restraining relative positional displacement of the first member 10 and the second member 20 with respect to the through hole 31. There is also an advantage of the first protrusion 11 that a mark of a laser irradiation position and propriety of a bead forming position can be visually checked.

As used herein, the "metal materials of the same type" mean metals that can be welded to each other and may be not only the same material but also metal materials, such as ferrous metal materials, nonferrous metal materials, or the like, which have a good weld joining property. In other words, the "metal materials of the same type" mean materials of the same type which have good compatibility in welding.

Specifically, combinations of the first member 10 and the second member 20 in performing welding are as follows. For example, as combinations of ferrous metal materials, there are combinations of soft steel and soft steel, stainless and stainless, soft steel and high tensile steel, high tensile steel and high tensile steel, and the like. As combinations of nonferrous metal materials, there are combinations of aluminum and aluminum, aluminum and aluminum alloy, aluminum alloy and aluminum alloy, and the like.

The third member 30 as a material of a different type is a different material from those of the first member 10 and the second member 20 as metal materials of the same type and is a material that is difficult to weld to the first member 10 and the second member 20.

For example, in a case in which the first member 10 and the second member 20 as metal materials of the same type are ferrous metal materials, the third member 30 as a material of a different type is a nonferrous metal material, such as a copper material, an aluminum material, or the like, which has a low laser light absorptivity and is difficult to laser-weld. For example, examples of a material of a different type from the metal materials include a resin material, such as carbon fiber reinforced plastics (CFRP), polyethylene terephthalate (PET), or the like.

In this case, as illustrated in FIG. 2, before welding the first member 10 and the second member 20, the first protrusion 11 and the second protrusion 21 are inserted in the through hole 31 of the third member 30 and are disposed so as to face to each other in a plate-thickness direction with a predetermined space therebetween.

Figure 4:
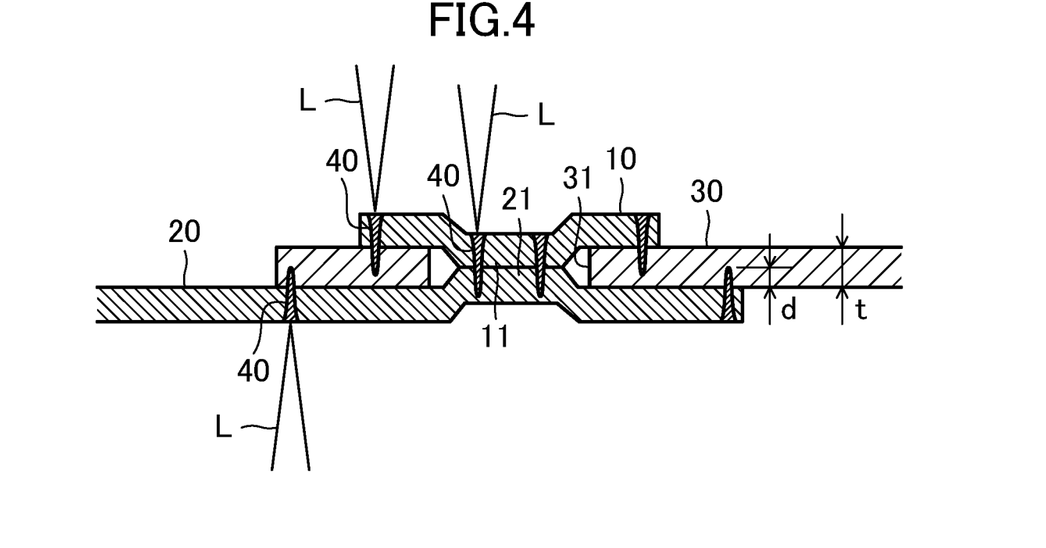
FIG. 4 is a cross-sectional view illustrating the joining structure after welding.
Figure 5:
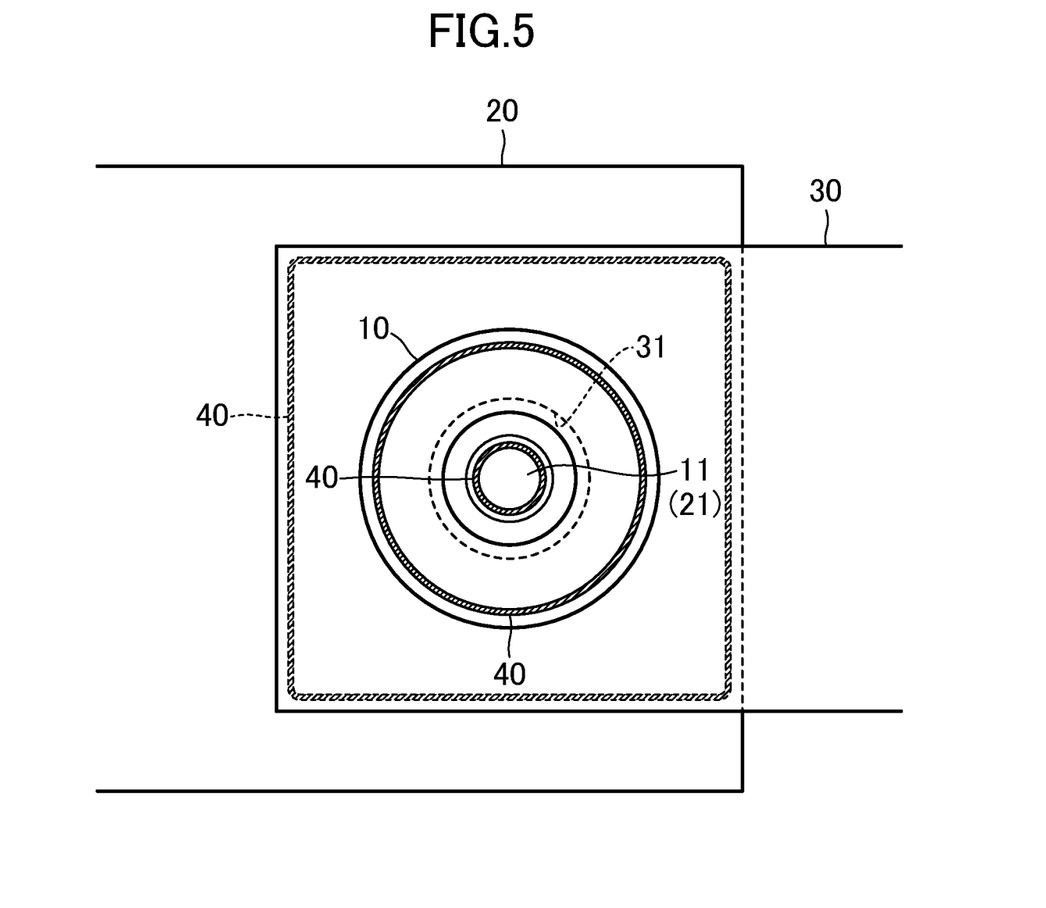
FIG. 5 is a plan view of illustrating the joining structure after welding.

As illustrated in FIG. 4 and FIG. 5, joining of the first member 10 and the second member 20 is performed by laser welding. Specifically, laser welding is performed by radiating laser light L in a circular shape toward a region corresponding to the first protrusion 11, that is, a region (a joinable range) that can be irradiated with the laser light L, from an upper side of the first member 10 in the plate-thickness direction.

When the laser light L is radiated in a circular shape to the first protrusion 11 to perform laser welding, a welded portion 40 is formed during welding. At this time, a molten metal of the welded portion 40 of the first member 10 and the second member 20 is solidified and shrunk, and therefore, a gap between the first protrusion 11 and the second protrusion 21 is reduced.

As described above, in the region corresponding to the first protrusion 11 which is irradiated with the laser light L, the laser light L is radiated in the plate-thickness direction in a state before welding in which the gap exists, the first member 10 and the second member 20 as metal materials of the same type are melt and jointed to each other and then solidified and shrunk, and the third member 30 as a material of a different type interposed therebetween is compressed and fixed.

Incidentally, in the joining structure in which the third member 30 that is a material of a different type is interposed between the first member 10 and the second member 20 that are metal materials of the same type, there is a probability that moisture enters a portion in which the first member 10, the second member 20, and the third member 30 overlap, so that an electrolytic corrosion occurs.

Therefore, in this embodiment, each of an outer peripheral portion of an overlapping portion of the first member 10 and the third member 30 and an outer peripheral portion of an overlapping portion of the second member 20 and the third member 30 is welded.

Specifically, as illustrated in FIG. 4 and FIG. 5, the laser light L is radiated in a circular shape from the upper side of the first member 10 in the plate-thickness direction along the outer peripheral portion of the overlapping portion of the first member 10 and the third member 30. Thus, the first member 10 and the third member 30 are melted to form the welded portion 40, and a sealed joining structure in which a gap between the first member 10 and the third member 30 in an overlapping direction is filled can be achieved.

Note that, although, in an example illustrated in FIG. 4, only the outer peripheral portion of the overlapping portion of the first member 10 and the third member 30 is laser-welded, the first member 10, the second member 20, and the third member 30 may be melted and jointed to each other, for example, radiating the laser light L such that the laser light L reaches the third member 3.

For the outer peripheral portion of the overlapping portion of the second member 20 and the third member 30, laser welding is performed by radiating the laser light L from a side which is formed of a material having a high laser absorption rate.

For example, in a case in which the second member 20 is formed of a soft steel material and the third member 30 is formed of an aluminum material, laser welding is performed by radiating the laser light L in a quadrangular shape from a lower side of the second member 20 in the plate-thickness direction along the outer peripheral portion of the overlapping portion of the first member 10 and the third member 30, because the soft steel material has a lower reflectance to the laser light L than that of the aluminum material, that is, the soft steel material has a higher laser absorption rate than that of the aluminum material. Thus, energy of the laser light L can be efficiently absorbed, and the second member 20 and the third member 30 can be sufficiently melted.

Then, the outer peripheral portion of the overlapping portion of the second member 20 and the third member 30 is melted to form the welded portion 40 and a sealed joining structure in which a gap between the second member 20 and the third member 30 in the overlapping direction is filled can be achieved.

Note that, although compatibility of the second member 20 and the third member 30 in terms of the weld joining property is poor, it is merely needed to ensure airtightness, and therefore, a very high joining strength of this portion is not required.

Therefore, a penetration depth d from an overlapping surface of the third member 30 located in an opposite side to a side that is irradiated with the laser light L may be a depth that is equal to or larger than 20% of a plate thickness t of the third member 30. Thus, the laser light L can be kept from passing through the third member 30 and airtightness can be ensured. Note that similar applies to the penetration depths in the first member 10 and the third member 30.

With the above described configuration, invasion of moisture into the overlapping portions of the first member 10, the second member 20, and the third member 30 from outside can be restrained. Thus, in the overlapping portions of the first member 10, the second member 20, and the third member 30, the occurrence of an electrolytic corrosion can be restrained and the joining strength can be ensured.

Second Embodiment

Figure 6:
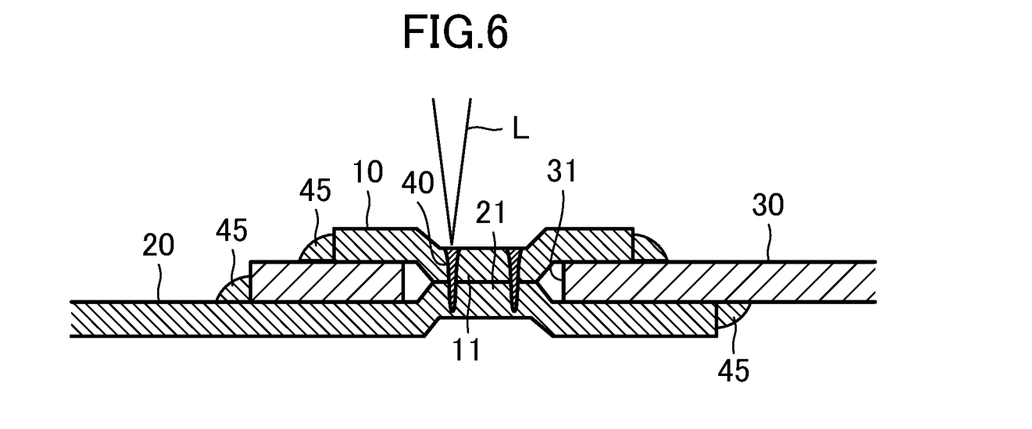
FIG. 6 is a cross-sectional view illustrating a joining structure after welding according to a second embodiment.

FIG. 6 is a cross-sectional view illustrating a joining structure after welding according to a second embodiment. The same components as those in the first embodiment will be denoted by the same reference symbols as those in the first embodiment and only different points will be described below.

Figure 7:
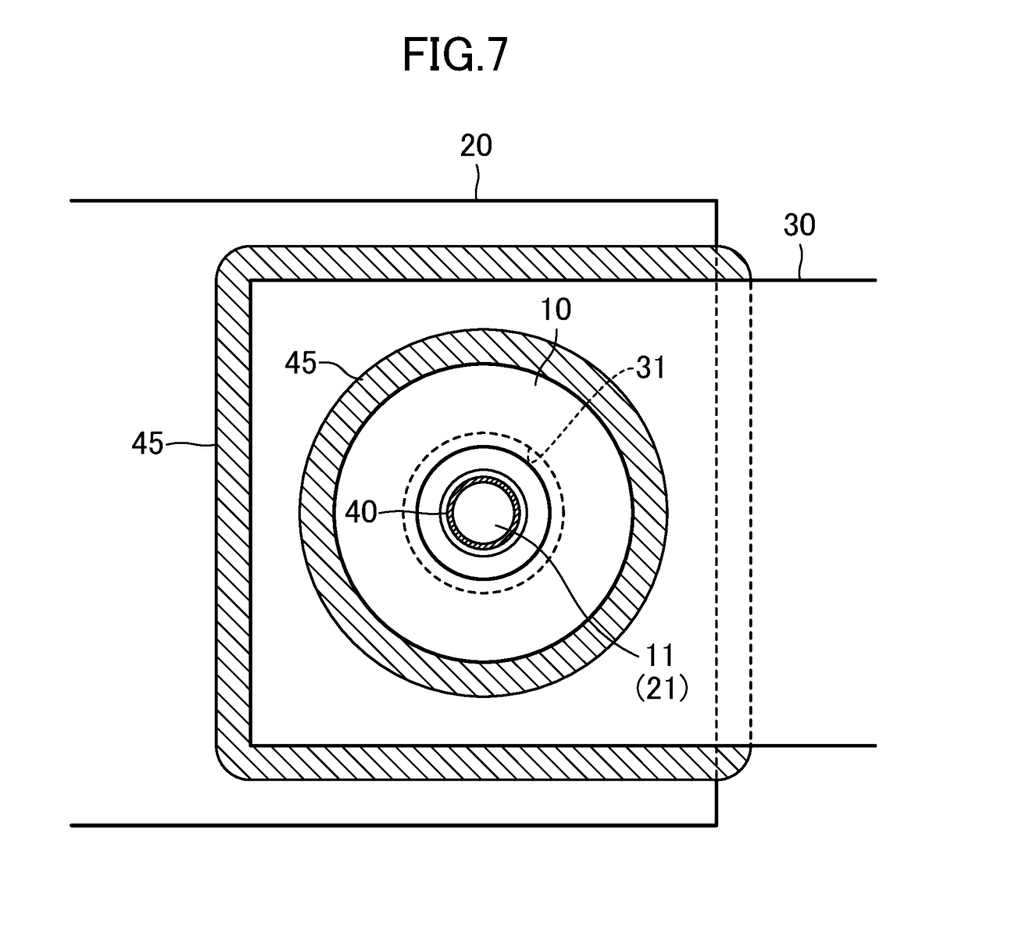
FIG. 7 is a plan view illustrating the joining structure after welding.

As illustrated in FIG. 6 and FIG. 7, the welded portion 40 is formed by radiating the laser light L in a circular shape to a region corresponding to the first protrusion 11 and the second protrusion 21 from an upper side in the plate-thickness direction. Thus, the first member 10 and the second member 20 are laser-welded.

The outer peripheral portion of the overlapping portion of the first member 10 and the third member 30 is welded using a filler material. Specifically, arc welding or laser filler welding is performed along an outer peripheral corner portion of the overlapping portion of the first member 10 and the third member 30. Note that, in a case in which the first member 10 is a soft steel material and the third member 30 is an aluminum material, it is necessary to use a filler material exclusively used for materials of different types with which the soft steel material and the aluminum material can be welded.

Thus, a sealed joining structure in which the gap between the first member 10 and the third member 30 in the overlapping direction is filled with a welded portion 45 formed of the filler material that has been melt and jointed can be achieved.

Similarly, the outer peripheral portion of the overlapping portion of the second member 20 and the third member 30 is welded using a filler material. Specifically, arc welding or laser filler welding is performed along an outer peripheral corner of the overlapping portion of the second member 20 and the third member 30. Thus, a sealed joining structure in which the gap between the second member 20 and the third member 30 in the overlapping direction is filled with the welded portion 45 formed of the filler material that has been melt and jointed can be achieved.

With the above described configuration, invasion of moisture into the overlapping portions of the first member 10, the second member 20, and the third member 30 from outside can be restrained. Thus, the occurrence of an electrolytic corrosion in the overlapping portions of the first member 10, the second member 20, and the third member 30 can be restrained and the joining strength can be ensured.

Other Embodiments

Each of the above described embodiments may have a following configuration.

In the above described embodiments, the first protrusion 11 and the second protrusion 21 have the same shape, but the first protrusion 11 and the second protrusion 21 may have different shapes. Moreover, a protrusion is provided in each of both the first member 10 and the second member 20, but a protrusion may be provided only one of the first member 10 and the second member 20. As for a laser radiation direction, the laser light L is radiated from a side in which the first member 10 is provided, but the laser light L may be radiated from a side in which the second member 20 is provided.

In the above described embodiments, the materials of the first member 10 and the second member 20 are metal materials of the same type and, for example, a case in which a soft steel material is used for each of the first member 10 and the second member 20 has been described. However, different materials may be used for the first member 10 and the second member 20 as long as the materials are metal materials of the same type which can be welded to each other and can achieve an enough joining strength.

In the second embodiment, arc welding or laser filler welding using a filler material is performed on the outer peripheral portion of the overlapping portion of the first member 10 and the third member 30 and the outer peripheral portion of the overlapping portion of the second member 20 and the third member 30. However, the present disclosure is not limited to this form.

Figure 8:
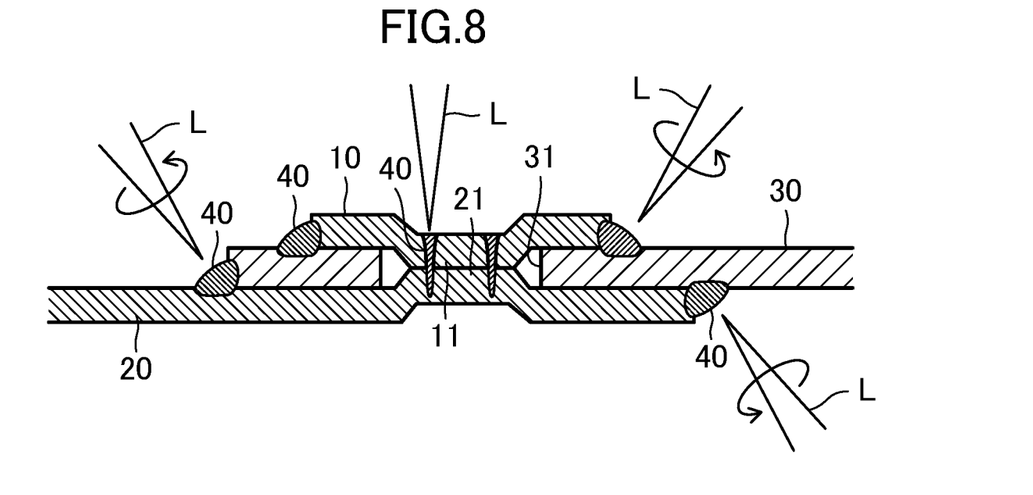
FIG. 8 a cross-sectional view illustrating a joining structure after welding according to another embodiment.

For example, as illustrated in FIG. 8, by radiating the laser light L from a diagonal direction along the outer peripheral corner portion of the overlapping portion of the first member 10 and the third member 30 while moving the laser light L such that the laser light L turns in a spin orbit, the outer peripheral corner portion may be melted, and thus, the first member 10 and the third member 30 may be welded. Note that, for the outer peripheral corner portion of the overlapping portion of the second member 20 and the third member 30, welding may be performed in a similar manner.

As described above, according to the present disclosure, a highly practical effect that the occurrence of an electrolytic corrosion in a portion in which metal materials of the same type and a material of a different type overlap can be restrained is achieved, and therefore, the present disclosure is very useful and has high industrial applicability.

The invention claimed is:

1. A joining structure, comprising:
a first member formed of a metal material;
a second member formed of a metal material of a same type as that of the first member which can be welded to the first member; and
a third member formed of a material that is difficult to weld to the first member and the second member,
the first member, the second member, and the third member being jointed to each other, wherein
at least one of the first member and the second member includes a protrusion,
a through portion in which the protrusion is inserted is formed in the third member,
the first member and the second member are welded to each other via the through portion with the third member interposed therebetween in a region corresponding to the protrusion, and
an entire outer peripheral portion of an overlapping portion of the first member and the third member is welded, and an entire outer peripheral portion of an overlapping portion of the second member and the third member is welded.

2. The joining structure of claim 1, wherein
each of the first and second members includes a protrusion, respective regions of the first member and the second member corresponding to the protrusions are laser-welded to each other, the entire outer peripheral portion of the overlapping portion of the first member and the third member is laser-welded, and the entire outer peripheral portion of the overlapping portion of the second member and the third member is laser-welded.

3. The joining structure of claim 2, wherein
the regions of the first member and the second member corresponding to the protrusions, the entire outer peripheral portion of the overlapping portion of the first member and the third member, and the entire outer peripheral portion of the overlapping portion of the second member and the third member are each laser-welded by radiating laser light from a side of one member among the first member, the second member, and the third member, which is formed of a material having a higher laser absorption rate.

4. The joining structure of claim 1, wherein
each of the first and second members includes a protrusion, and respective regions of the first member and the second member corresponding to the protrusions are laser-welded, and
the entire outer peripheral portion of the overlapping portion of the first member and the third member and the entire outer peripheral portion of the overlapping portion of the second member and the third member are each welded using a filler material.

5. A joining method,
in which a first member formed of a metal material, a second member formed of a metal material of a same type as that of the first member which can be welded to the first member, and a third member formed of a material that is difficult to weld to the first member and the second member are joined to each other,
at least one of the first member and the second member being configured such that a protrusion is provided therein,
the third member being configured such that a through portion in which the protrusion is inserted is formed therein,
the joining method comprising:
inserting the protrusion in the through portion of the third member and interposing the third member between the first member and the second member;
welding the first member and the second member to each other via the through portion by radiating laser light to a region corresponding to the protrusion; and
welding each of an entire outer peripheral portion of an overlapping portion of the first member and the third member and an entire outer peripheral portion of an overlapping portion of the second member and the third member.

* * * * *